United States Patent
Kuroda et al.

(10) Patent No.: US 10,847,030 B2
(45) Date of Patent: Nov. 24, 2020

(54) PARKING SPACE SEARCH DEVICE, PARKING SPACE SEARCHING METHOD, AND RECORDING MEDIUM

(71) Applicant: Panasonic Intellectual Property Management Co., Ltd., Osaka (JP)

(72) Inventors: Toyoharu Kuroda, Kanagawa (JP); Hiroyuki Yoshida, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

(21) Appl. No.: 16/303,174

(22) PCT Filed: May 10, 2017

(86) PCT No.: PCT/JP2017/017622
§ 371 (c)(1),
(2) Date: Nov. 20, 2018

(87) PCT Pub. No.: WO2017/212849
PCT Pub. Date: Dec. 14, 2017

(65) Prior Publication Data
US 2019/0333384 A1  Oct. 31, 2019

(30) Foreign Application Priority Data
Jun. 7, 2016  (JP) .................. 2016-113574

(51) Int. Cl.
*G08G 1/14* (2006.01)
*B60W 30/06* (2006.01)

(52) U.S. Cl.
CPC ............ *G08G 1/141* (2013.01); *B60W 30/06* (2013.01); *B60W 2420/42* (2013.01); *B60W 2554/00* (2020.02)

(58) Field of Classification Search
CPC .. G08G 1/141; B60W 30/06; B60W 2554/00; B60W 2420/42
See application file for complete search history.

(56) References Cited

U.S. PATENT DOCUMENTS 7,542,835 B2 *  6/2009  Takahama .............. G01C 21/26
                                                      250/330
9,291,469 B2 *  3/2016  Hoch .................. G01C 21/3682
                    (Continued)

FOREIGN PATENT DOCUMENTS

EP        2093129       8/2009
JP        2009-151378   7/2009
              (Continued)

OTHER PUBLICATIONS

International Search Report of PCT application No. PCT/JP2017/017622 dated Aug. 8, 2017.

*Primary Examiner* — Behrang Badii
*Assistant Examiner* — Daniel L Greene
(74) *Attorney, Agent, or Firm* — Greenblum & Bernstein, P.L.C.

(57) ABSTRACT

A parking space search device includes an input receiver, and a controller. The input receiver receives, from an object detector mounted on a vehicle, information related to an object present at a travel direction-side with respect to the vehicle. The controller estimates a parking lot based on the information that the input receiver receives. The controller performs control of, when the estimated parking lot is on one of a left direction and a right direction with respect to the travel direction of the vehicle, shifting a travel route of the vehicle to another one of the left direction and the right direction. The controller searches for a parking space for the vehicle based on the information that the input receiver receives after the travel route of the vehicle is shifted.

6 Claims, 8 Drawing Sheets

(56) References Cited

U.S. PATENT DOCUMENTS

| | | | |
|---|---|---|---|
| 9,539,911 B2* | 1/2017 | Ohashi | H02J 5/005 |
| 9,854,185 B2* | 12/2017 | Stein | G06K 9/00791 |
| 9,891,059 B2* | 2/2018 | Kmiecik | G01C 21/005 |
| 2009/0178876 A1* | 7/2009 | Miki | B62D 7/142 |
| | | | 180/411 |
| 2010/0274446 A1 | 10/2010 | Sasajima et al. | |
| 2014/0132767 A1* | 5/2014 | Sonnabend | G08G 1/144 |
| | | | 348/148 |
| 2015/0206015 A1* | 7/2015 | Ramalingam | G06K 9/6262 |
| | | | 382/104 |
| 2015/0353080 A1* | 12/2015 | Mukaiyama | B62D 15/025 |
| | | | 701/23 |
| 2016/0125736 A1* | 5/2016 | Shaik | G08G 1/14 |
| | | | 701/23 |
| 2016/0284217 A1* | 9/2016 | Lee | B62D 15/0285 |
| 2017/0018184 A1* | 1/2017 | Northrup | G08G 1/144 |
| 2017/0080976 A1* | 3/2017 | Choi | B62D 15/0275 |
| 2017/0148324 A1* | 5/2017 | High | G06K 9/00771 |
| 2017/0197615 A1* | 7/2017 | Elie | B60W 10/20 |

FOREIGN PATENT DOCUMENTS

| | | |
|---|---|---|
| JP | 4530060 B | 8/2010 |
| JP | 4682488 B | 5/2011 |
| JP | 4817015 B | 11/2011 |
| JP | 2013-021280 | 1/2013 |
| JP | 5845131 B | 1/2016 |

* cited by examiner

PARKING SPACE SEARCH DEVICE, PARKING SPACE SEARCHING METHOD, AND RECORDING MEDIUM

CROSS-REFERENCE TO RELATED APPLICATIONS

This application is a U.S. national stage application of the PCT International Application No. PCT/JP2017/017622 filed on May 10, 2017, which claims the benefit of foreign priority of Japanese patent application 2016-113574 filed on Jun. 7, 2016, the contents all of which are incorporated herein by reference.

TECHNICAL FIELD

The present disclosure relates to a parking space search device, a program, and a recording medium.

BACKGROUND ART

Conventionally, as a device for searching for an available parking space, a device for determining availability of parking for vehicle is disclosed in PTL 1, for example. In this device for determining availability of parking for vehicle, a radar device transmits a radio wave at predetermined time intervals to scan a predetermined horizontal-direction angular range around a subject vehicle. An electronic control unit, when a reflection wave generated by the radio wave being reflected at an object is received, detects a reflection point on the object at which the radio wave is reflected based on the reception result of the reflection wave. Further, the electronic control unit determines whether a parking space is present or not based on vehicle dimension data of the subject vehicle stored in advance and an arrangement of reflection points, and further determines whether or not parking in the parking space can be performed.

CITATION LIST

Patent Literature

PTL 1: Unexamined Japanese Patent Publication No. 2009-151378

SUMMARY OF THE INVENTION

The present disclosure provides a parking space search device, a program, and a recording medium that are capable of determining a parking space with higher accuracy.

One aspect of the present disclosure is a parking space search device including an input unit, and a controller. The input unit receives, from an object detector mounted on a vehicle, information related to an object present at a side of a travel direction of the vehicle with respect to the vehicle. The controller estimates a parking lot based on first information that the input unit receives. The controller performs control of, when the estimated parking lot is on one of a left direction and a right direction with respect to the travel direction of the vehicle, shifting a travel route of the vehicle to another one of the left direction and the right direction. The controller searches for a parking space for the vehicle based on the information that the input unit receives after the travel route of the vehicle is shifted.

Another aspect of the present disclosure is a program for causing a computer to function as a first input step, a trajectory deviation step, a second input step, and a search step. In the first input step, from an object detector mounted on a vehicle, information related to an object present at a side of a travel direction of the vehicle with respect to the vehicle is received. In the trajectory deviation step, a parking lot is estimated based on the information received in the first input step, and control is performed of, when the estimated parking lot is on one of a left direction and a right direction with respect to the travel direction of the vehicle, shifting a travel route of the vehicle to another one of the left direction and the right direction. In the second input step, from the object detector after the trajectory deviation step, information related to an object present at the side of the travel direction of the vehicle with respect to the vehicle is received. In the search step, a parking space for the vehicle is searched for based on the information received in the second input step.

Yet another aspect of the present disclosure is a computer-readable recording medium recording a program for causing a computer to function as a first input step, a trajectory deviation step, a second input step, and a search step. In the first input step, from an object detector mounted on a vehicle, information related to an object present at a side of a travel direction of the vehicle with respect to the vehicle is received. In the trajectory deviation step, a parking lot is estimated based on the information received in the first input step, and control is performed of, when the estimated parking lot is on one of a left direction and a right direction with respect to the travel direction of the vehicle, shifting a travel route of the vehicle to another one of the left direction and the right direction. In the second input step, from the object detector after the trajectory deviation step, information related to an object present at the side of the travel direction of the vehicle with respect to the vehicle is received. In the search step, a parking space for the vehicle is searched for based on the information received in the second input step.

According to the present disclosure, a parking space search device, a program, and a recording medium that are capable of determining a parking space with higher accuracy can be provided.

DESCRIPTION OF EMBODIMENT

Prior to describing an exemplary embodiment of the present disclosure, a problem found in a conventional technique will be briefly described herein. The greater the distance is to an object, the sparser the density of reflection points is. Accordingly, it is difficult to accurately determine a parking space from afar with the device for determining availability of parking for vehicle as disclosed in PTL 1.

1. Exemplary Embodiment

In the following, detailed description will be provided of parking space search device 1, program P0, and a recording medium of the present disclosure, with reference to the drawings.

1-1. Definitions

In each of FIGS. 4 to 8, x, y, and z axes are perpendicular to one another. It is regarded that an x-y plane, for example, indicates a road surface on which vehicle V on which parking space search device 1 is mounted (hereinafter referred to as "subject vehicle V") travels. The x axis, for example, indicates a travel direction of subject vehicle V on the road surface. In the following, description is continued regarding that the travel direction is a forward direction. Further, the y axis indicates a right direction with respect to the travel direction of vehicle V. The z axis indicates a vertically-upward direction with respect to the road surface.

It is regarded that an origin of this coordinate system is the point when a left-right direction center of a travel-direction front edge of subject vehicle V is projected onto the road surface, for the sake of convenience. That is, with respect to the origin, the forward direction of subject vehicle V takes positive values on the x axis and the right direction takes positive values on the y axis.

1-2. Structure of Parking Space Search Device 1 and Peripheral Structure

Figure 1:
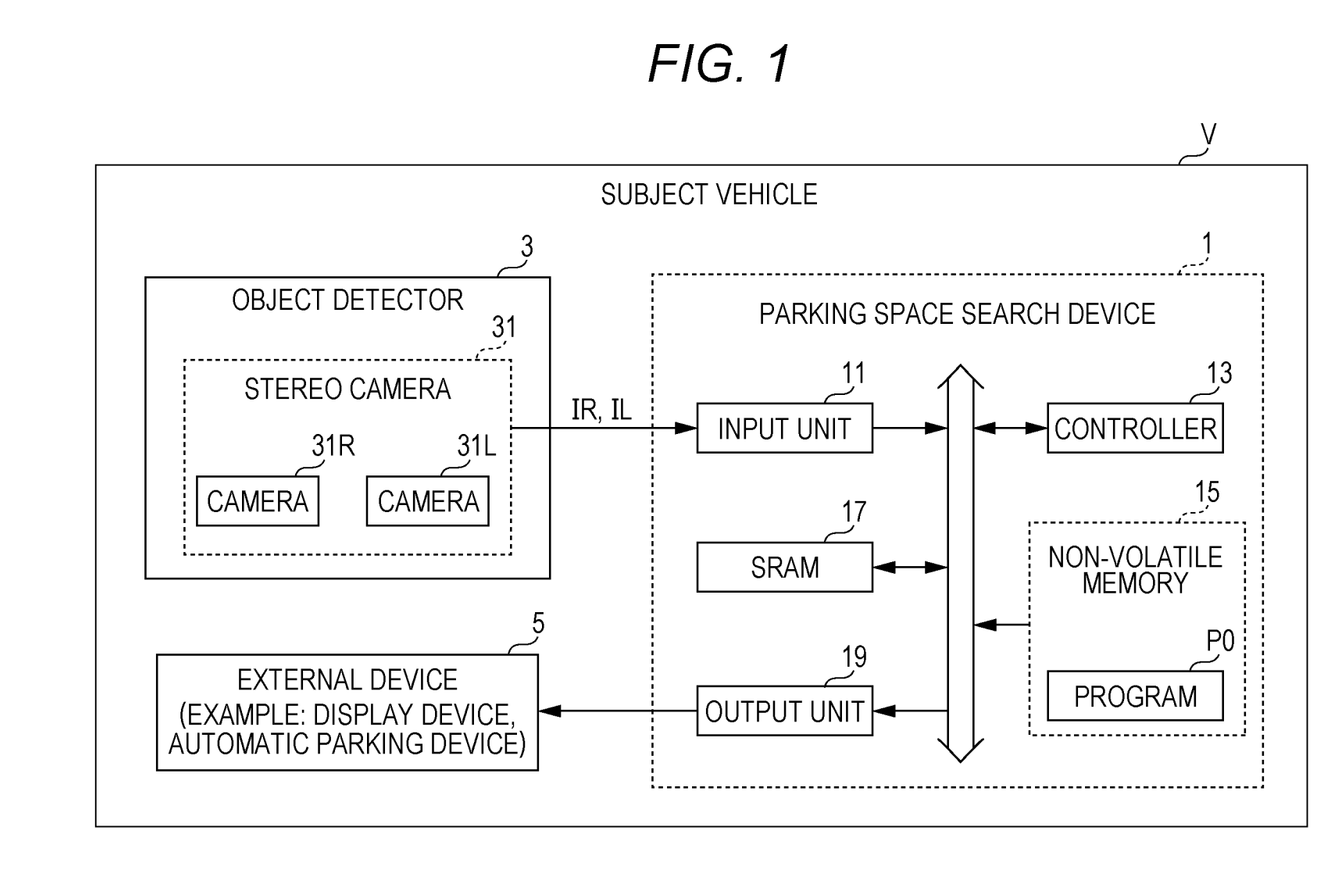
FIG. 1 is a diagram illustrating a hardware structure of a parking space search device of the present disclosure.

In FIG. 1, subject vehicle V is capable of automatic driving, and parking space search device 1 and object detector 3 are mounted on subject vehicle V.

Object detector 3 acquires information indicating objects (for example, object vehicles, walls, etc.) that are present around subject vehicle V, particularly objects that are present at the travel direction-side with respect to subject vehicle V. Such objects may include objects that become obstacles during later described automatic parking.

As object detector 3 described above, stereo camera 31 at least including a pair of cameras 31R, 31L is typical. Object detector 3 is, however, not limited to stereo camera 31, and may be a laser radar or a millimeter-wave radar.

Cameras 31R, 31L typically have a same specification as each other, and are installed on subject vehicle V to be parallel and level with respect to each other. One typical installation location is the front of a windshield rearview mirror of subject vehicle V. More specifically, cameras 31R, 31L are attached to face the forward direction at a right lateral side and a left lateral side of the windshield rearview mirror.

Further, cameras 31R, 31L, in a state in which synchronization of shutter timings is established based on synchronization signals from parking space search device 1 and the like, take images of a situation in the forward direction of subject vehicle V on a regular basis and output image information IR, IL of a predetermined frame rate to parking space search device 1.

Parking space search device 1 is, for example, connected with cameras 31R, 31L to be capable of data communication with cameras 31R, 31L over a controller area network (CAN), for example, and is housed inside an electronic control unit (ECU) of subject vehicle V. Parking space search device 1 includes input unit 11, controller 13, non-volatile memory 15, static random access memory (SRAM) 17, and output unit 19.

Input unit 11 is an input interface of the ECU, and receives image information IR, IL from cameras 31R, 31L. Further, input unit 11, under control of controller 13, transfers received image information IR, IL to SRAM 17. Output unit 19 is an output interface of the ECU, and outputs information generated by later-described controller 13 to external device 5 (for example, a display device, an automatic parking device, etc.) of parking space search device 1.

1-3. Functional Blocks of Controller

Figure 2:
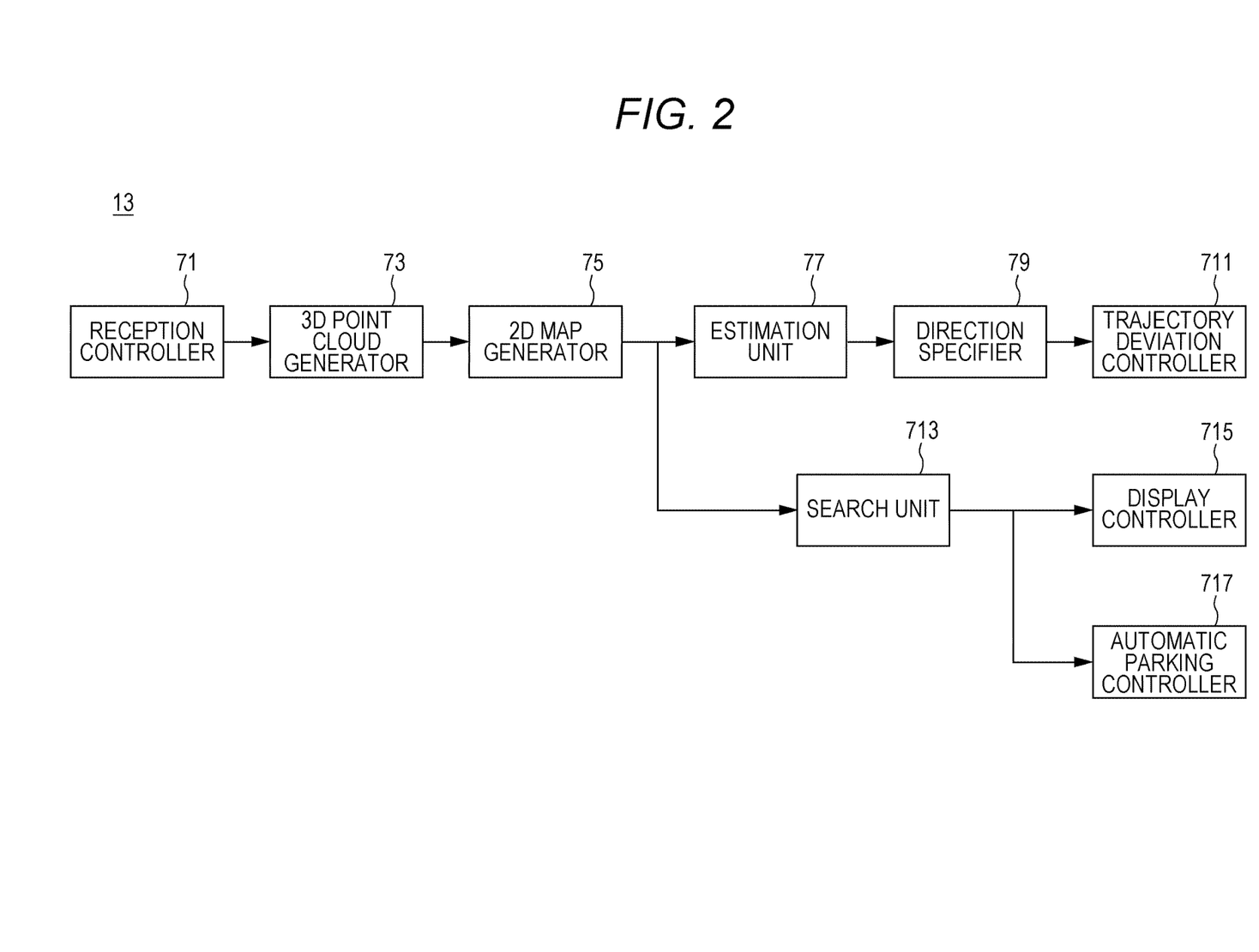
FIG. 2 is a diagram illustrating a functional block structure of a controller illustrated in FIG. 1.

Controller 13, for example, is a microcomputer and executes program P0 stored in advance in non-volatile memory 15 by using SRAM 17 as a working area. Controller 13, by executing program P0 in such a manner, functions as: reception controller 71; three-dimensional (3D) point cloud generator 73; two-dimensional (2D) map generator 75; estimation unit 77; direction specifier 79; trajectory deviation controller 711; search unit 713; display controller 715; and automatic parking controller 717, as illustrated in FIG. 2.

1-4. Processing Procedure of Controller

Figure 3:
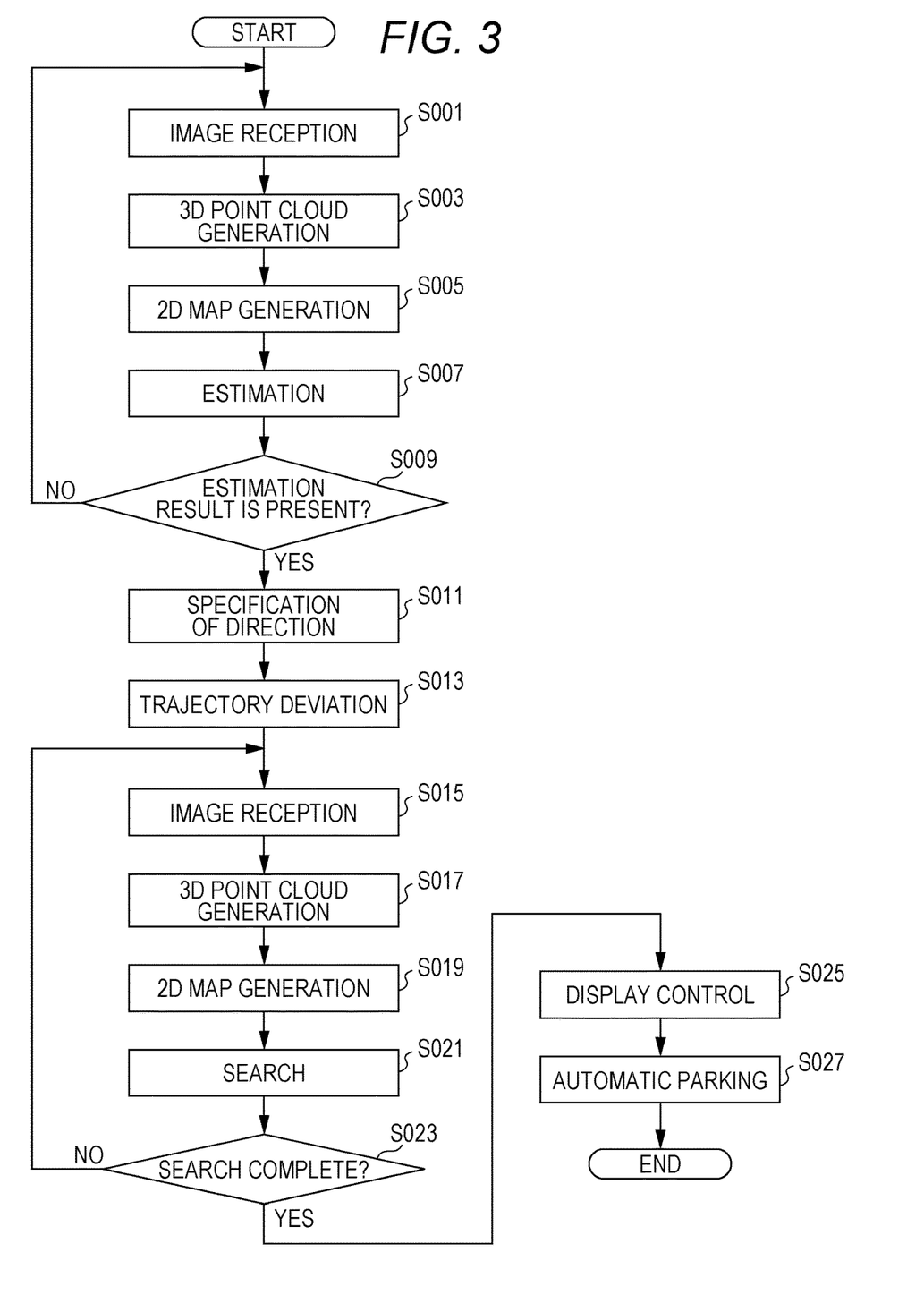
FIG. 3 is a flowchart illustrating a processing procedure of the controller illustrated in FIG. 1.

Next, a processing procedure of controller 13 is described in detail, with reference to FIG. 3.

First, when a situation in which subject vehicle V is to be parked in a parking lot is entered, controller 13 functions as reception controller 71 and controls input unit 11 so that input unit 11 transfers received image information IR, IL to SRAM 17 to be stored in SRAM 17 (FIG. 3: step S001).

Figure 4:
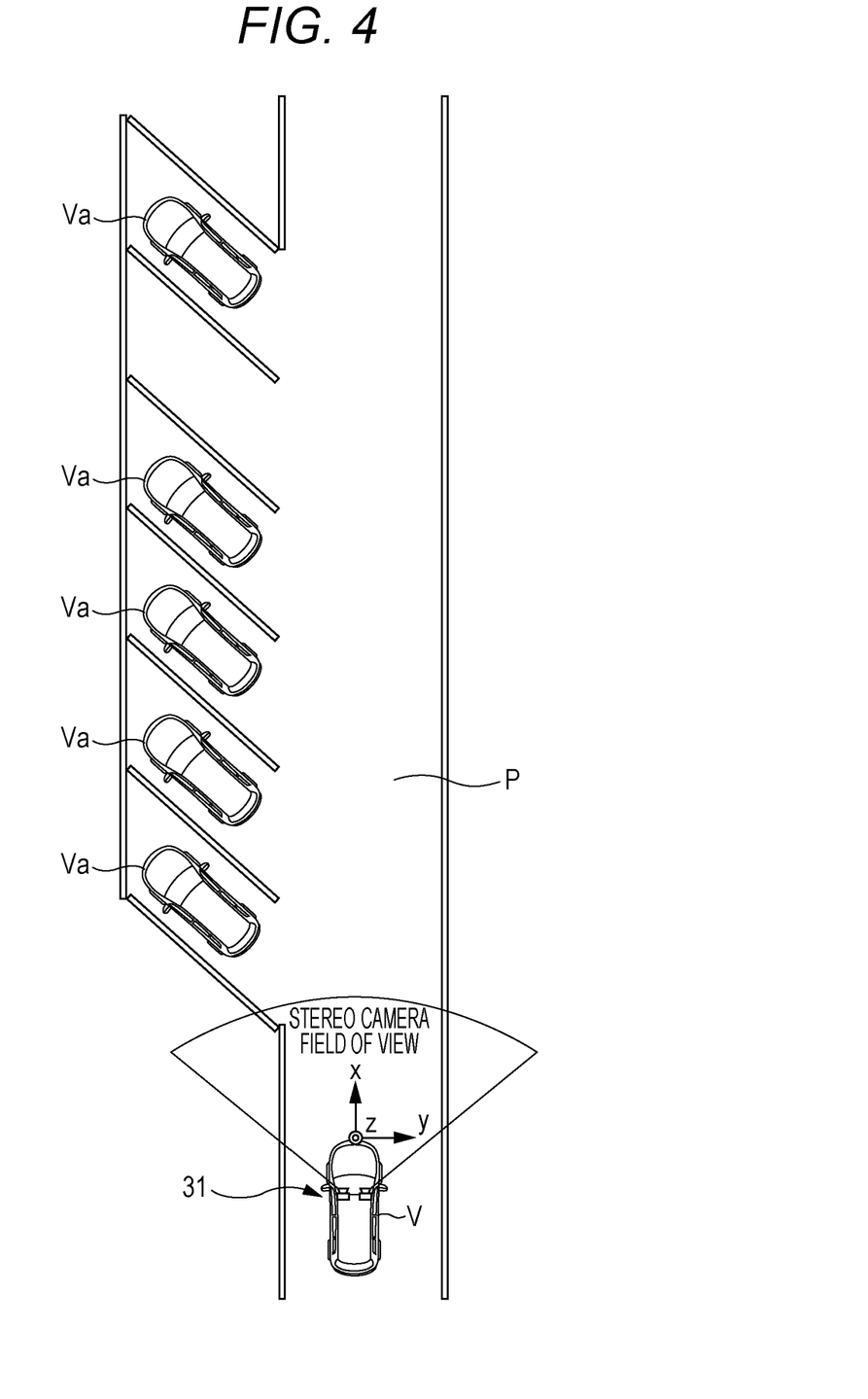
FIG. 4 is a diagram when a parking lot, an image of which is taken by a stereo camera in FIG. 1, is seen from above.
Figure 5:
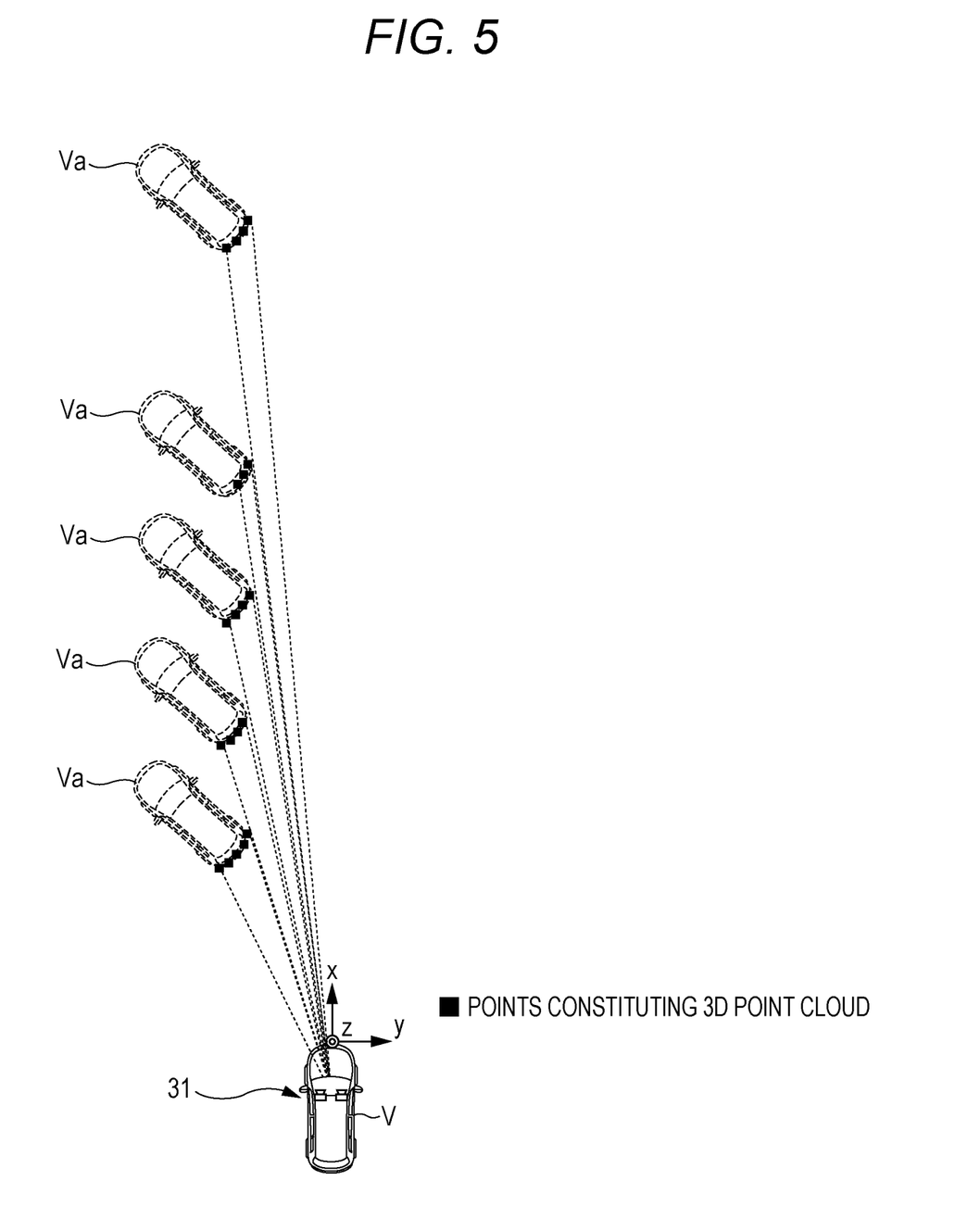
FIG. 5 is a schematic diagram illustrating a 3D point cloud.
Figure 6:
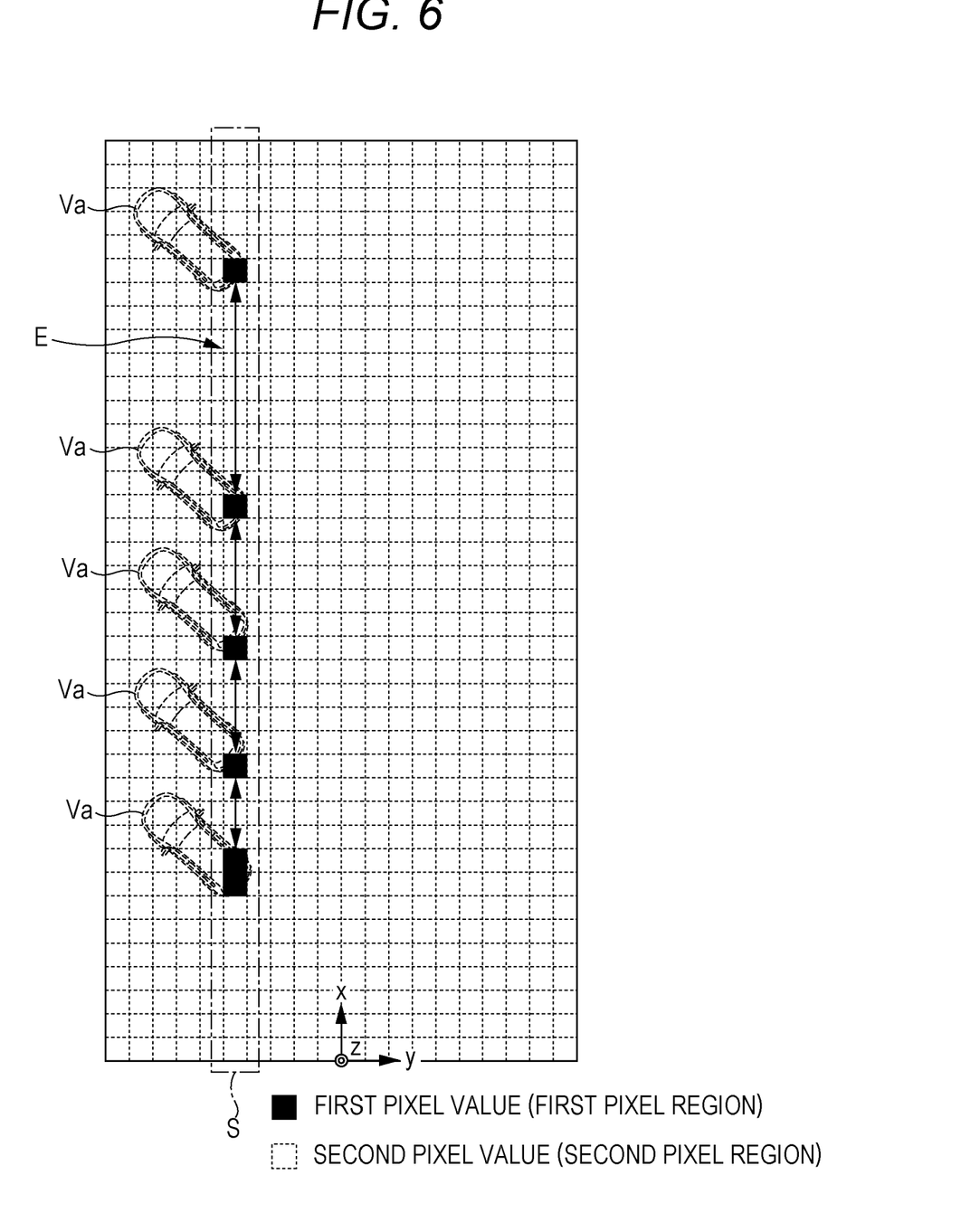
FIG. 6 is a schematic diagram illustrating a 2D map.

Here, FIG. 4 is a diagram when a parking lot, an image of which is taken by stereo camera 31, is seen from above. In the example illustrated in FIG. 4, a plurality of object vehicles Va are parked diagonally and in parallel. In the present disclosure, the term "diagonal parallel parking" refers to a state in which a plurality of object vehicles Va are parked side-by-side with longitudinal center lines of object vehicles Va inclined with respect to vehicle pathway P (that is, the travel direction of subject vehicle V), and is an intermediate concept between in-line parking and parallel parking.

Next, controller 13 functions as 3D point cloud generator 73, and generates, from image information IR, IL having been developed in SRAM 17 through the processing in step S001, coordinate value groups (referred to in the following as a "3D point cloud") indicating three-dimensional shapes of objects present in the travel direction of subject vehicle V (step S003). Description is continued regarding that the coordinate value groups include values in the coordinate system defined in <1-1. Definitions> described above, while the situation may actually differ.

Further, in step S003, it is preferable that a coordinate value group indicating a road surface portion be removed from the 3D point cloud generated from image information IR, IL. Specifically, a coordinate value group in which a z coordinate value is zero or substantially zero is removed. As a result of this processing, the 3D point cloud includes only coordinate value groups of objects present on the road surface. This 3D point cloud, as illustrated for example in FIG. 5, includes coordinate value groups of end parts (that is, front ends or rear ends) of the plurality of object vehicles Va parked diagonally and in parallel in the parking lot. Note that points indicating front edges and rear edges are indicated by black squares (■) in FIG. 5.

Next, controller 13 functions as 2D map generator 75, and sets z coordinate values included in the 3D point cloud yielded in step S003 to zero to generate a 2D map in which all points constituting the 3D point cloud are projected onto the road surface (the x-y plane) (step S005). Further, due to object detector 3 being stereo camera 31 in the present disclosure, there are cases in which pixel values in image information IR, IL indicate light intensity and color. In such a case, controller 13, as illustrated for example in FIG. 6, assigns a first pixel value (for example, a pixel value indicating black) to all regions indicating objects in the 2D map and assigns a second pixel value (for example, a pixel value indicating white) to the rest of the regions in the 2D map.

Next, controller 13 functions as estimation unit 77 and performs estimation of a parking lot based on the 2D map yielded in step S005 (step S007). In the following, a specific example of the processing in step S007 is given. As is obvious from the description above, in the 2D map, end parts of objects (object vehicles Va) are indicated by first pixel values and parts other than the end parts of the objects are indicated by second pixel values. Controller 13 estimates, as row S of parking spaces, or that is, as a parking lot, a portion S in the 2D map at which a plurality of first pixel regions line up in a manner resembling a straight line with spaces E between the first pixel regions.

Next, controller 13 determines whether or not a parking lot has been estimated in step S007 (step S009). When determining that the parking lot has not been estimated (NO), controller 13 returns to step S001. Meanwhile, when determining that the parking lot has been estimated (YES), controller 13 executes step S011.

Next, controller 13 functions as direction specifier 79 and specifies at which of the left and right directions the parking lot estimated in step S007 is present with respect to the travel direction of subject vehicle V (step S011). Specifically, the direction can be specified based on whether the y coordinate value of the portion estimated as a parking lot has a positive value or a negative value.

Figure 7:
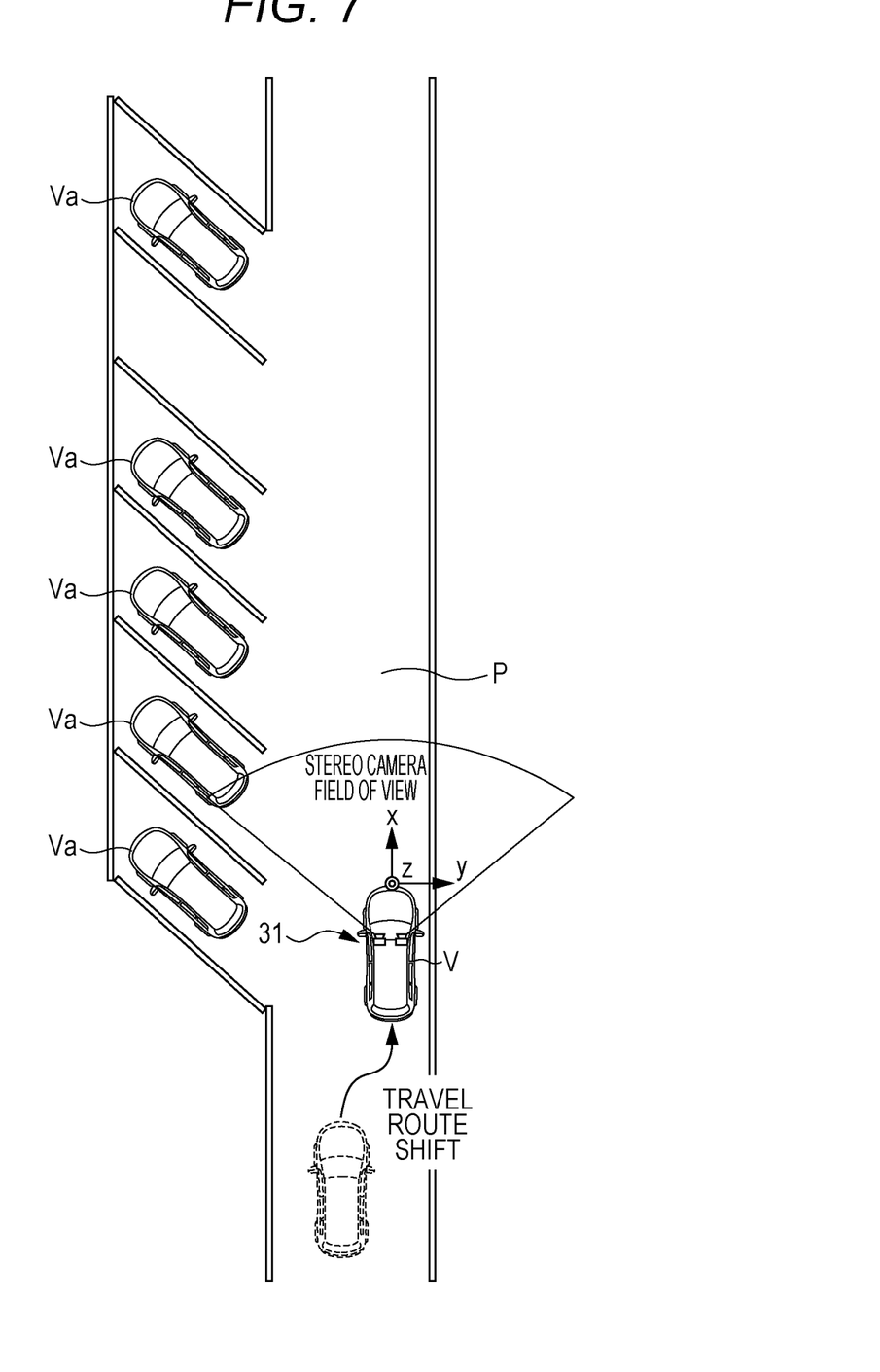
FIG. 7 is a schematic diagram illustrating a shift of a travel route of a subject vehicle.

Next, controller 13 functions as trajectory deviation controller 711 (step S013). In step S013, controller 13 controls a steering amount of subject vehicle V so that a travel route of subject vehicle V is shifted in an opposite direction from the direction of the parking lot specified in step S011, as illustrated in FIG. 7. The shift amount is not particularly limited but does not exceed a distance to an object present at the opposite-direction side of the parking lot with respect to subject vehicle V. Further, the steering amount is set as appropriate so that the travel route of subject vehicle V is shifted safely and as quickly as possible, and is preferably set based on a vehicle speed of subject vehicle V. To provide a specific example, the steering amount is set relatively small when the vehicle speed is high and is set relatively large when that is not the case.

Next, controller 13 executes steps S015, S017, and S019 similar to steps S001, S003, and S005 to create a 2D map similar to the 2D map described above based on image information IR, IL acquired after the shift of the travel route of subject vehicle V.

Next, controller 13 functions as search unit 713 and searches for a parking space for subject vehicle V based on the 2D map yielded in step S019 (step S021). In the following, a specific example of the processing in step S021 is given. A search is performed for a space between two adjacent first pixel regions that has a size equal to or greater than a predetermined value, as an entrance of a parking space. Here, the predetermined value is set, as appropriate, to a value yielded by adding a margin to an overall width of subject vehicle V.

Note that in step S021, a space between first pixel regions that is located at a distance equal to or smaller than a predetermined value from subject vehicle V is not searched for as an entrance, even when the space has a size equal to or greater than the predetermined value. In other words, entrances of parking spaces searched for by search unit 713 are limited to parking spaces entrances located at a distance exceeding the predetermined value from subject vehicle V. This is because subject vehicle V cannot safely enter a parking space if an entrance of the parking space is too close to subject vehicle V. Note that the predetermined value is set, as appropriate, based on the speed of subject vehicle V, and is calculated in advance through experimentation, etc.

Conventionally, proposals have been made of automatic search for a parking space using stereo camera 31. However, according to the present disclosure, the travel route of subject vehicle V is shifted in an opposite direction from the direction (parking lot) specified in step S011 before the automatic search for a parking space, and thus, stereo camera 31 can view entrances more clearly even from afar. Automatic search is carried out in this state, and thus, a search for a parking space from afar can be performed more accurately than conventionally possible.

Next, controller 13 determines whether or not a parking space has been found in step S021 (step S023). When determining that the parking space has not been found (NO), controller 13 returns to step S015. Meanwhile, when determining that the parking space has been found (YES), controller 13 executes step S025.

Controller 13, in step S025, functions as display controller 715 and causes a display device, which is one example of external device 5, to display a message indicating that the search for a parking space has been successful.

Further, controller 13, in step S027, functions as automatic parking controller 717 and passes information on the parking space found in step S021 to an automatic parking device, which is another example of external device 5. The automatic parking device parks subject vehicle V in the parking space according to known technology.

1-5. Actions and Effects of Parking Space Search Device 1

As described above, according to parking space search device 1, the travel route of subject vehicle V is shifted in the opposite direction from the direction (that is, either the left direction or the right direction) specified in step S011 before the automatic search for a parking space in step S021 in FIG. 3. Accordingly, stereo camera 31 is capable of more clearly viewing an entrance to be searched for even from afar, and when the automatic search in step S021 is carried out in this state, it becomes possible to promptly determine whether a parking space is suitable for parking subject vehicle V, etc. As a result, it becomes possible to search for a parking space more quickly and accurately than conventionally possible.

Further, parking space search device 1 is particularly suitable for diagonal parallel parking in which subject vehicle V is to be parked in a parking space the entrance of which is facing subject vehicle V, as illustrated in FIG. 4. More specifically, this is because, in this type of diagonal parallel parking, it becomes difficult to park subject vehicle V in a target parking space when subject vehicle has passed the parking space. Meanwhile, according to parking space search device 1, in this type of diagonal parallel parking, it is easy to park subject vehicle V in a parking space that is found because the search for a parking space can be completed from afar.

Figure 8:
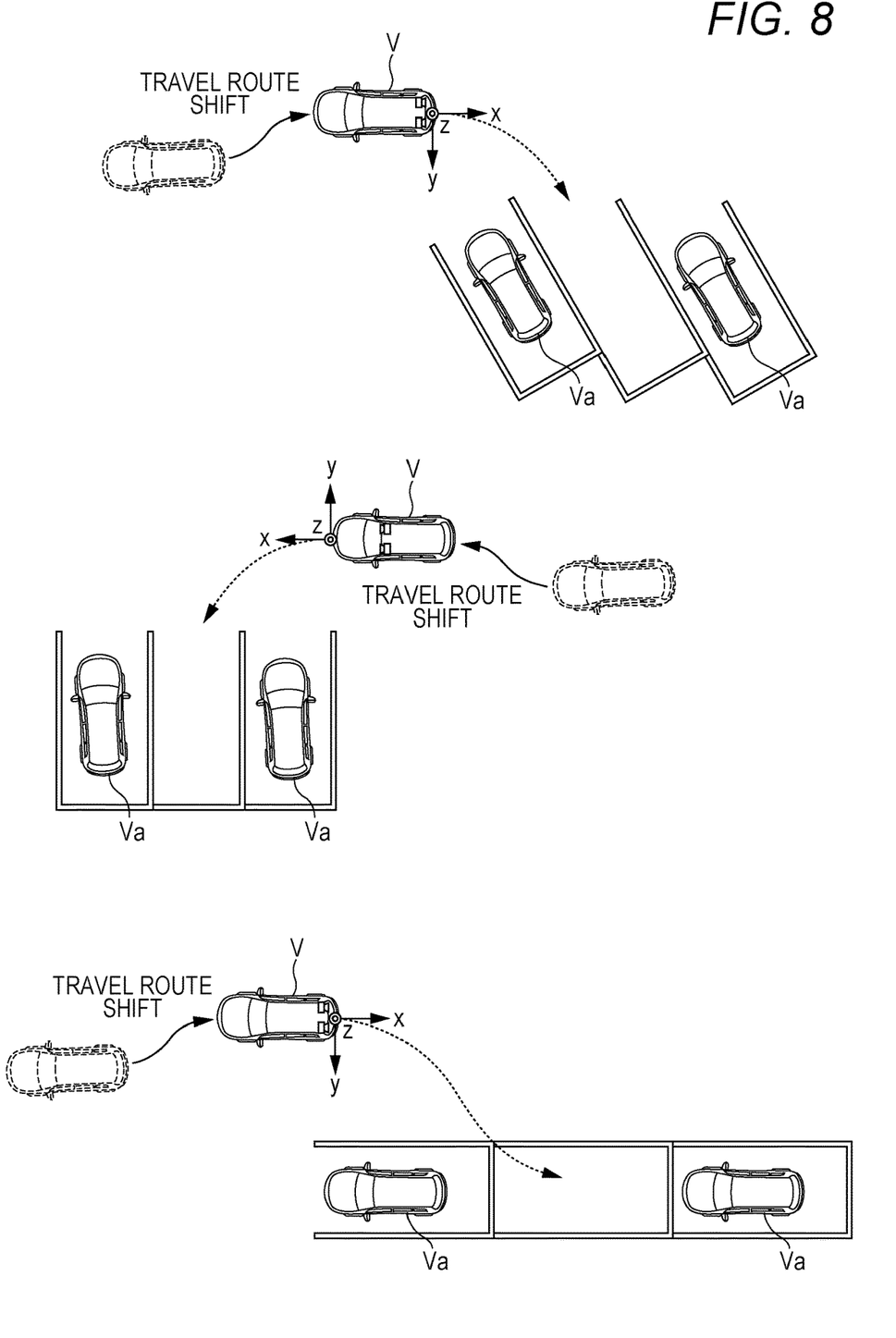
FIG. 8 is a schematic diagram illustrating diagonal parking (backward parking), perpendicular parking, and parallel parking.

Note that parking space search device 1 is not only applicable to forward parking in diagonal parallel parking, but also is applicable to backward parking in diagonal parallel parking as illustrated in the topmost tier of FIG. 8, to parallel parking illustrated in the middle tier of FIG. 8, and further to in-line parking illustrated in the bottom tier of FIG. 8.

1-6. Supplementary Notes

In the description provided above, the 3D point cloud and the 2D map are generated based on image information IR, IL of stereo camera 31. However, without limitation to this, the 3D point cloud and the 2D map can also be generated based on distance images that acquired from laser radars, millimeter-wave radars, etc.

In the description provided above, the estimation of a parking lot is performed in step S007 based on a sequence of spaces between first pixel regions in the 2D map. However, without limitation to this, the estimation of a parking lot may be performed based on well-known white line detection technology when a parking lot is segmented by white lines. This point similarly applies to step S021.

In the above, description is provided that program P0 is stored in non-volatile memory 15. However, without limitation to this, program P0 may be stored and provided in a computer-readable recording medium (including, for example, a non-transitory storage medium such as a digital versatile disc (DVD), etc.). In addition, program P0 may be stored in a server device so that various terminal devices can download program P0.

INDUSTRIAL APPLICABILITY

A parking space search device according to the present disclosure is capable of determining a parking space with higher accuracy and is suitable during automatic parking, etc.

REFERENCE MARKS IN THE DRAWINGS

1: parking space search device
11: input unit
13: controller
15: non-volatile memory
17: SRAM
19: output unit
3: object detector
31: stereo camera
31R, 31L: cameras
5: external device
71: reception controller
73: 3D point cloud generator
75: 2D map generator
77: estimation unit
79: direction specifier
711: trajectory deviation controller
713: search unit
715: display controller
717: automatic parking controller
IR, IL: image information
P: vehicle pathway
P0: program
V: subject vehicle (vehicle)
Va: object vehicles

The invention claimed is:

1. A parking space search device comprising:
an input receiver that receives, from an object detector mounted on a vehicle, information related to an object present at a side of a travel direction of the vehicle with respect to the vehicle; and
a controller that estimates a parking lot based on the information that the input receiver receives, performs control of, when the estimated parking lot is on one of a left direction and a right direction with respect to the travel direction of the vehicle, shifting a travel route of the vehicle to be further away from the estimated parking lot either in the left direction or the right direction, and searches for a parking space for the vehicle based on the information that the input receiver receives after the travel route of the vehicle is shifted.

2. The parking space search device according to claim 1, wherein the controller searches for the parking space located at a distance exceeding a predetermined value from the vehicle.

3. The parking space search device according to claim 1, wherein the controller, after searching for the parking space, outputs an instruction to an automatic parking device mounted on the vehicle to park in the searched parking space.

4. The parking space search device according to claim 1, wherein the travel route of the vehicle is shifted to move in a direction opposite of the estimated parking lot along a lateral axis of the travel direction of the vehicle.

5. A parking space searching method comprising:
first receiving, from an object detector mounted on a vehicle, information related to an object present at a side of a travel direction of the vehicle with respect to the vehicle;
estimating a parking lot based on the information received in the first receiving and performing control of, when the estimated parking lot is on one of a left direction and a right direction with respect to the travel direction of the vehicle, shifting a travel route of the vehicle to be further away from the estimated parking lot either in the left direction or the right direction;
second receiving, from the object detector, after the estimating, information related to an object present at the side of the travel direction of the vehicle with respect to the vehicle; and
searching for a parking space for the vehicle based on the information received in the second receiving.

6. A non-transitory computer-readable recording medium recording a program for causing a computer to function as:
first receiving, from an object detector mounted on a vehicle, information related to an object present at a side of a travel direction of the vehicle with respect to the vehicle;
estimating a parking lot based on the information received in the first receiving and performing control of, when the estimated parking lot is on one of a left direction and a right direction with respect to the travel direction of the vehicle, shifting a travel route of the vehicle to be further away from the estimated parking lot either in the left direction or the right direction;
second receiving, from the object detector, after the estimating, information related to an object present at the side of the travel direction of the vehicle with respect to the vehicle; and searching for a parking space for the vehicle based on the information received in the second receiving.

\* \* \* \* \*